(12) United States Patent
Ebihara et al.

(10) Patent No.: US 6,522,044 B1
(45) Date of Patent: Feb. 18, 2003

(54) DISC-TYPE COMMUTATOR FOR ELECTRIC ROTATING MACHINE

(75) Inventors: Jiro Ebihara, Nukata-gun (JP); Hajime Ohta, Anjo (JP); Akiyasu Ito, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/161,608

(22) Filed: Jun. 5, 2002

(30) Foreign Application Priority Data

Aug. 3, 2001 (JP) ........................................ 2001-236170

(51) Int. Cl.$^7$ ........................... H02K 13/04; H02K 13/00
(52) U.S. Cl. ........................ 310/233; 310/233; 310/237; 310/239; 310/245
(58) Field of Search ................................ 310/173, 224, 310/233, 239, 245, 237

(56) References Cited

U.S. PATENT DOCUMENTS

| | | | |
|---|---|---|---|
| 3,521,101 A | * | 7/1970 | Arora .......................... 310/233 |
| 4,580,334 A | * | 4/1986 | McCracken .................. 29/597 |
| 5,650,683 A | | 7/1997 | Shiga et al. |
| 6,359,362 B1 | * | 3/2002 | Schmidt ..................... 310/237 |

* cited by examiner

*Primary Examiner*—Tran Nguyen
*Assistant Examiner*—Iraj A Mohandesi
(74) *Attorney, Agent, or Firm*—Oliff & Berridge, PLC

(57) ABSTRACT

A disc-type commutator is mounted on a rear end surface of an armature of an electrical rotating machine. Plural commutator segments are radially arranged around a rotating shaft, separated from one another by radially extending commutator gaps. A width of the commutator gap is gradually widened along a radial direction of the commutator, so that foreign particles, such as swarfs or brush dusts, entered in the commutator gap are removed by a centrifugal force generated in rotation of the armature. Further, the width of the commutator gap may be gradually widened along its depth direction so that the width becomes wider at its open end that at its closed end.

5 Claims, 2 Drawing Sheets

FRONT SIDE ←    22    REAR SIDE →

DISC-TYPE COMMUTATOR FOR ELECTRIC ROTATING MACHINE

CROSS-REFERENCE TO RELATED APPLICATION

This application is based upon and claims benefit of priority of Japanese Patent Application No. 2001-236170 filed on Aug. 3, 2001, the content of which is incorporated herein by reference.

BACKGROUND OF THE INVENTION

1. Field of the Invention

The present invention relates to a disc-type commutator for an electric rotating machine.

2. Description of Related Art

A disc-type commutator mounted on an axial end of an armature of an electric rotating machine such as a fuel pump motor or a starter motor has been known hitherto. There are two types of disc-type commutator. One is a separate type which is made separately from armature conductors and mounted on an armature end surface. The other is a unitary type which is made integrally with armature conductors. In those disc-type commutators, commutator segments are arranged in a radial direction on an axial end surface of an armature, and segment gaps between commutator segments are open to the axial end surface that constitutes a commutating surface. A width of the segment gap is made as narrow as possible to effectively utilize the commutating surface and to reduce a current density on the commutating surface.

By using the disc-type commutator, it is possible to shorten an axial length of an armature, compared with an armature using an cylinder-type commutator. However, there has been a problem in the conventional disc-type commutator. That is, swarfs generated in a process of machining the commutating surface enter into the segment gaps that are open to the commutating surface, and it is difficult to remove those swarfs from the segment gaps. Further, brush dusts and other foreign particles entered into the segment gaps during operation of the rotating machine are not easy to remove from the segment gaps. When the cylinder-type commutator is used, such dusts or foreign particles can be removed by a centrifugal force generated by rotation of the armature. It is difficult, however, to remove the foreign particles from the segment gaps of the disc-type commutator. If such foreign particles remain in the segment gaps, a proper insulation between segments cannot be maintained, or abnormal abrasion of brushes may occur. This may result in malfunction of the commutator.

SUMMARY OF THE INVENTION

The present invention has been made in view of the above-mentioned problem, and an object of the present invention is to provide an improved disc-type commutator in which foreign particles entered into the segment gaps are easily removed.

The disc-type commutator is composed of an insulating disc and plural commutator segments radially disposed on the insulating disc, forming a commutating surface. The commutator segments are separated from one another by segment gaps formed between neighboring commutator segments. The disc-type commutator is mounted on a rear end surface of an armature of an electric rotating machine so that the commutator surface is positioned perpendicularly to a rotating axis of the armature. Conductors forming an armature coil disposed in slots of an armature core are electrically connected to the commutator segments. One end of the segment gaps in the axial direction is open to the commutating surface and the other end is closed by the insulating disc.

A width of the segment gap in a rotational direction of the armature is narrow at the radial inside of the commutator and gradually widened toward the radial outside. The width may be made more than twice wider at the radial outside than at the radial inside. Swarfs entered into the segment gaps in a process of machining the commutating surface and foreign particles such as brush dusts entered during operation of the rotating machine are easily removed from the segment gaps by a centrifugal force generated by rotation because the segment gaps are widened at the radial outside.

Further, the width of the segment gap is gradually widened along the axial direction, so that the segment gap is the narrowest at its closed end contacting the insulating disc and the widest at its end open to the commutating surface. The segment gap may be widened symmetrically with respect to the axial direction, or asymmetrically widened by making a forward side surface of the commutator segement facing the rotational direction slanted more than a backward side surface.

According to the present invention foreign particles such as swarfs or brush dusts entered into the segment gaps can be easily removed, and thereby commutator functions are properly maintained for a long time.

Other objects and features of the present invention will become more readily apparent from a better understanding of the preferred embodiment described below with reference to the following drawings.

DETAILED DESCRIPTION OF THE PREFERRED EMBODIMENT

Figure 1:
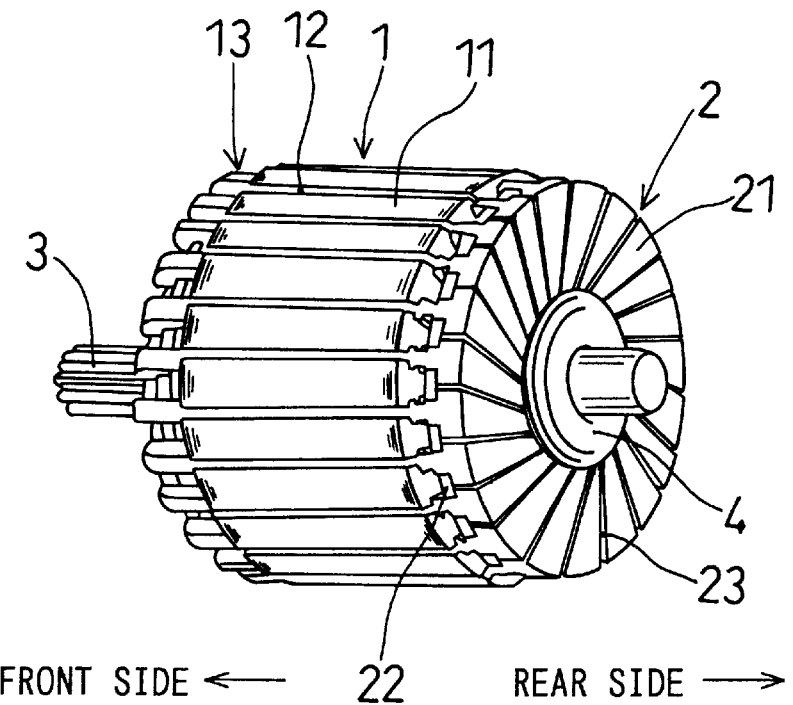
FIG. 1 is a perspective view showing an armature using a disc-type commutator of the present invention.

A preferred embodiment of the present invention will be described with reference to FIGS. 1–4. An armature 1 is composed of a shaft 3, an armature core 11 having plural slots 12, conductors 13 disposed in the slots 12, and a disc-type commutator 2 mounted on a rear side of the armature. The rear side and the front side are indicated by arrows in FIG. 1. In each slot 12, two conductors, an inner conductor and an outer conductor, are disposed. The inner conductor is positioned at an inside portion of the slot 12 and the outer conductor is positioned, laminated on the inner conductor, at an outside portion of the slot 12. Each of the inner and outer conductors 13 has a rectangular cross-section.

The outer conductor 13 disposed in one slot 12 is connected to the inner conductor 13 disposed in another slot 12 which is apart from the former slot by a predetermined number of slots (a slot pitch) via a connecting conductor. In other words, the outer conductor and the inner conductor are connected to each other through a connecting conductor, forming a pair of conductors in a U-shape. The number of the pairs of the conductors is the same as the number of slots 12. The connecting conductors are disposed at the front end surface of the armature 1, forming an coil end. An end of the outer conductor 13 extends to the rear surface of the armature 1 and is connected to an outer end of a commutator segment 21. Similarly, an end of the inner conductor 13 extends to the rear surface of the armature 1 and is connected to an inner end of the commutator segment 21. Preferably, the outer conductor 13 and the commutator segment 21 are integrally formed.

As shown in FIG. 1, the disc-type commutator 2 is mounted on the rear side surface of the armature 1. The disc-type commutator 2 is composed of an insulating disc 22 and commuator segments 21 arranged on the insulating disc 22 so that each commutator segment 21 extends in a radial direction, separated from one another by a segment gap 23. The number of the commutator segments 21 is equal to the number of the armature slots 12. After the disc-type commutator 2 is attached to the rear end of the armature 1, an end collar 4 made of an insulating material is installed on the shaft 3 so that the inner end portions of the commutator segments 21 are pushed toward the armature core 11. Thus, the disc-type commutator 2 is mounted on the armature 1. Further details of the armature structure will not be described here because the armature 1 having the disc-type commutator 2 is generally a know type.

Figure 2:
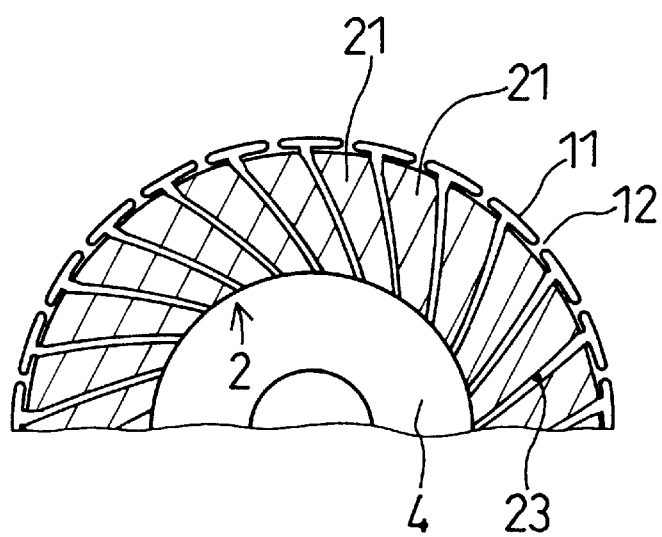
FIG. 2 is a plan view showing part of the disc-type commmutator shown in FIG. 1, viewed from a commutating surface.

The rear surface of the disc-type commutator 2 is shown in FIG. 2. The rear surface of the commutator 2 is machined after the commutator 2 is mounted on the armature 1 to set the thickness (a dimension in the axial direction) of the segments 21 to a predetermined dimension and to smoothen the surface. By this machining a smooth surface functioning as a commutating surface (hatched area in FIG. 2) is formed. In the machining process, swarfs enter into the segement gaps 23 together with machining oil.

Figure 3:
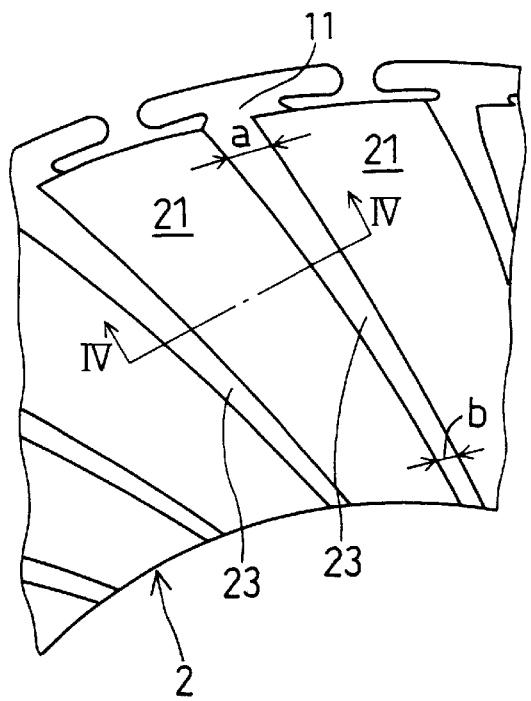
FIG. 3 is an enlarged plan view showing part of the disc-type commutator shown in FIG. 2.

The segment gaps 23 are shaped in the following manner, so that the swarfs entered into the segment gaps 23 are easily removed, and brush dusts and foreign particles entering into the segment gaps 23 during actual use of the commutator 2 do not remain in the segment gaps 23. As shown in FIG. 3, the segment gap 23 is not formed in a uniform width. The segment gap 23 having a width "b" at its inner portion is gradually enlarged so that its width becomes "a" at its outer portion. In this particular embodiment, the width "a" is made larger than two times of width "b".

The swarfs and oil entered into the segment gaps in the surface machining process can be removed by rotating the armature 1 after the armature 1 is completed, because the swarfs and oil are moved along the gradually widened segment gaps 23 by the centrifugal force and are removed from the outer periphery of the commutator 2. Alternatively, water or air is blown at a high speed to the commutator surface in a direction from its inside to outside. Since the segment gaps 23 are widened toward the outside, the swarfs and oil can be easily removed. Further, foreign particles such as brush dusts entering into the segments gaps 23 in operation of the rotating machine are automatically removed by a centrifugal force generated by rotation.

Figure 4:
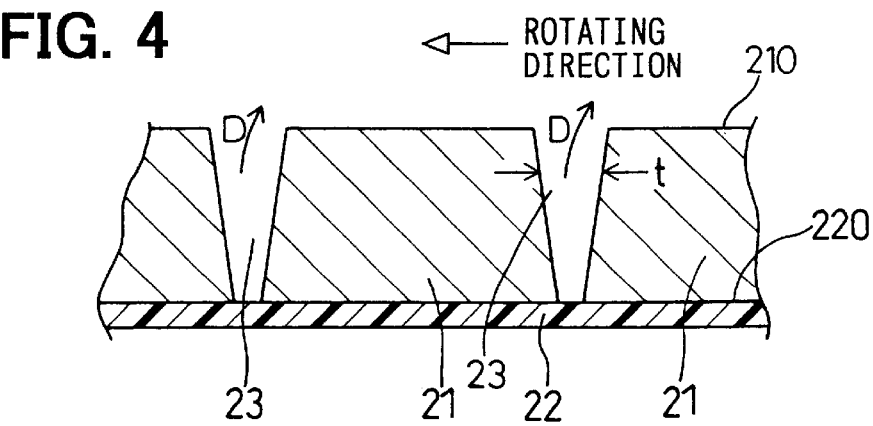
FIG. 4 is a cross-sectional view showing a segment gap formed in the disc-type commutator, taken along line IV—IV shown in FIG. 3.

The segment gap 23 may be formed in a shape shown in FIG. 4. The segment gap 23 is gradually widened along the axial line of the commutator 2. That is, a width "t" of the segment gap 23 is narrow at its bottom end contacting the insulating disc 22 and is gradually widened toward the commutating surface 210. Since the segment gap 23 is widened at its open end, the swarfs entered into the segment gap 23 can be easily removed by rotating the armature 1 or blasting water or air at a high speed. Foreign particles entering into the segment gaps 23 during operation of the rotating machine can be automatically removed. The swarfs or the foreign particles are removed in direction D when the armature 1 rotates in a direction shown with an arrow in FIG. 4. The shapes of the segment gap 23 shown in FIGS. 3 and 4 may be applied to the commutator independently from each other, or both may be applied at the same time.

Figure 5:
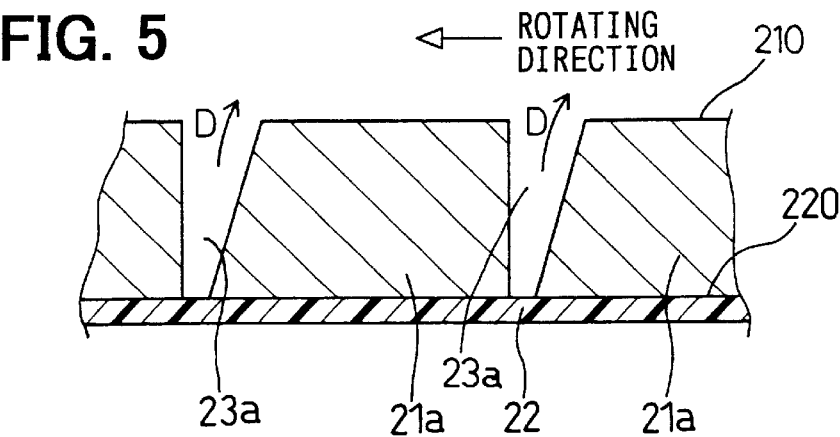
FIG. 5 is a cross-sectional view showing a modified form of the segment gap.

The shape of the segment gap shown in FIG. 4 may be modified to the form shown in FIG. 5. The segment gap 23 is widened symmetrically with respect to the axial direction perpendicular to the commutating surface in the example shown in FIG. 4. In FIG. 5, however, the segment gap 23a is asymmetrically widened with respect to the axial direction. That is, a forward side surface 211 of the commutator segment 21a facing a rotational direction is slanted more, with respect to the axial line, than a backward surface 212. The swarfs or the foreign particles in the segment gaps 23a can be removed in direction D. In this manner, the segment gap 23a can be widened while minimizing the commutating surface 210 sacrificed by the widened gap.

The present invention is equally applicable to the disc-type commutator in which the commutator segments 21 are formed integrally with the conductors 13 and to the disc-type commutator which is made separately from the conductors 13.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A disc-type commutator for an electric rotating machine comprising:
   an insulating disc fixed to a rotating shaft of the electric rotating machine;
   a plurality of commutator segments disposed in contact with the insulating disc, each commutator segment being aligned to extend in a radial direction thereby forming a disc-shaped commutating surface which is perpendicular to an axial direction of the rotating shaft; and
   a segment gap formed between side surfaces of neighboring commutator segments, one end of the segment gap in the axial direction being open to the commutating surface and the other end being closed by the insulating disc, wherein:
   a width of the segment gap in a rotating direction of the commutator is gradually widened along a radial direction of the commutator so that the width is the narrowest at a radial inside and the widest at an radial outside of the commutator.

2. A disc-type commutator for an electric rotating machine comprising:
   an insulating disc fixed to a rotating shaft of the electric rotating machine;
   a plurality of commutator segments disposed in contact with the insulating disc, each commutator segment being aligned to extend in a radial direction thereby forming a disc-shaped commutating surface which is perpendicular to an axial direction of the rotating shaft;

a segment gap formed between side surfaces of neighboring commutator segments, one end of the segment gap in the axial direction being open to the commutating surface and the other end being closed by the insulating disc, wherein:

the segment gap at its end closed by the insulating disc is gradually widened toward the commutating surface by slanting the side surfaces of the commutator segment with respect to the axial direction of the rotating shaft.

3. The disc-type commutator as in claim 1, wherein:

the width of the segment gap at the radial outside of the commutator is more than twice of the width at the radial inside.

4. The disc-type commutator as in claim 1, wherein:

the segment gap at its end closed by the insulating disc is gradually widened toward the commutating surface by slanting the side surfaces of the commutator segment with respect to the axial direction of the rotating shaft.

5. The disc-type commutator as in claim 2, wherein:

a forward side surface of the commutator facing a rotating direction of the commutator is slanted more than a backward side surface with respect to the axial direction of the rotating shaft.

* * * * *